United States Patent [19]

Burchfiel et al.

[11] Patent Number: 4,661,719
[45] Date of Patent: Apr. 28, 1987

[54] AUXILIARY SWITCHING CIRCUIT

[75] Inventors: Loyal E. Burchfiel, Anaheim; John M. Baker, Santa Ana, both of Calif.

[73] Assignee: J. B. Enterprises, Anaheim, Calif.

[21] Appl. No.: 660,741

[22] Filed: Oct. 15, 1984

[51] Int. Cl.⁴ .............................................. H02J 3/14
[52] U.S. Cl. ...................................... 307/38; 307/141; 307/143; 307/41; 137/624.11; 239/70
[58] Field of Search ............... 307/112, 116, 117, 118, 307/38, 41, 141, 143; 361/166, 168, 169; 239/63, 64, 70; 137/552.7, 624.2, 624.11, 624.15

[56] References Cited

U.S. PATENT DOCUMENTS

| | | | |
|---|---|---|---|
| 3,869,854 | 3/1975 | Church | 368/156 |
| 3,989,066 | 11/1976 | Sturman et al. | 137/624.2 |
| 4,012,673 | 3/1977 | Saarem et al. | 137/624.11 X |
| 4,061,927 | 12/1977 | Link | 307/41 |
| 4,101,786 | 7/1978 | Ruggles et al. | 307/38 |
| 4,114,647 | 9/1978 | Sturman et al. | 239/70 X |
| 4,215,277 | 7/1980 | Weiner et al. | 307/41 |
| 4,232,707 | 11/1980 | Sturman et al. | 137/624.2 |
| 4,244,022 | 1/1981 | Kendall | 137/624.2 X |
| 4,304,989 | 12/1981 | Vos et al. | 137/624.2 X |
| 4,548,225 | 10/1985 | Busalacchi | 239/70 X |

Primary Examiner—William M. Shoop, Jr.
Assistant Examiner—Shik Luen Paul Ip
Attorney, Agent, or Firm—G. Donald Weber, Jr.

[57] ABSTRACT

A circuit device which is connected to an existing clocked memory circuit to provide additional clocked memory circuitry for a plurality of substantially independent switches within the parameters and constraints established at the main control station for an existing switch.

19 Claims, 4 Drawing Figures

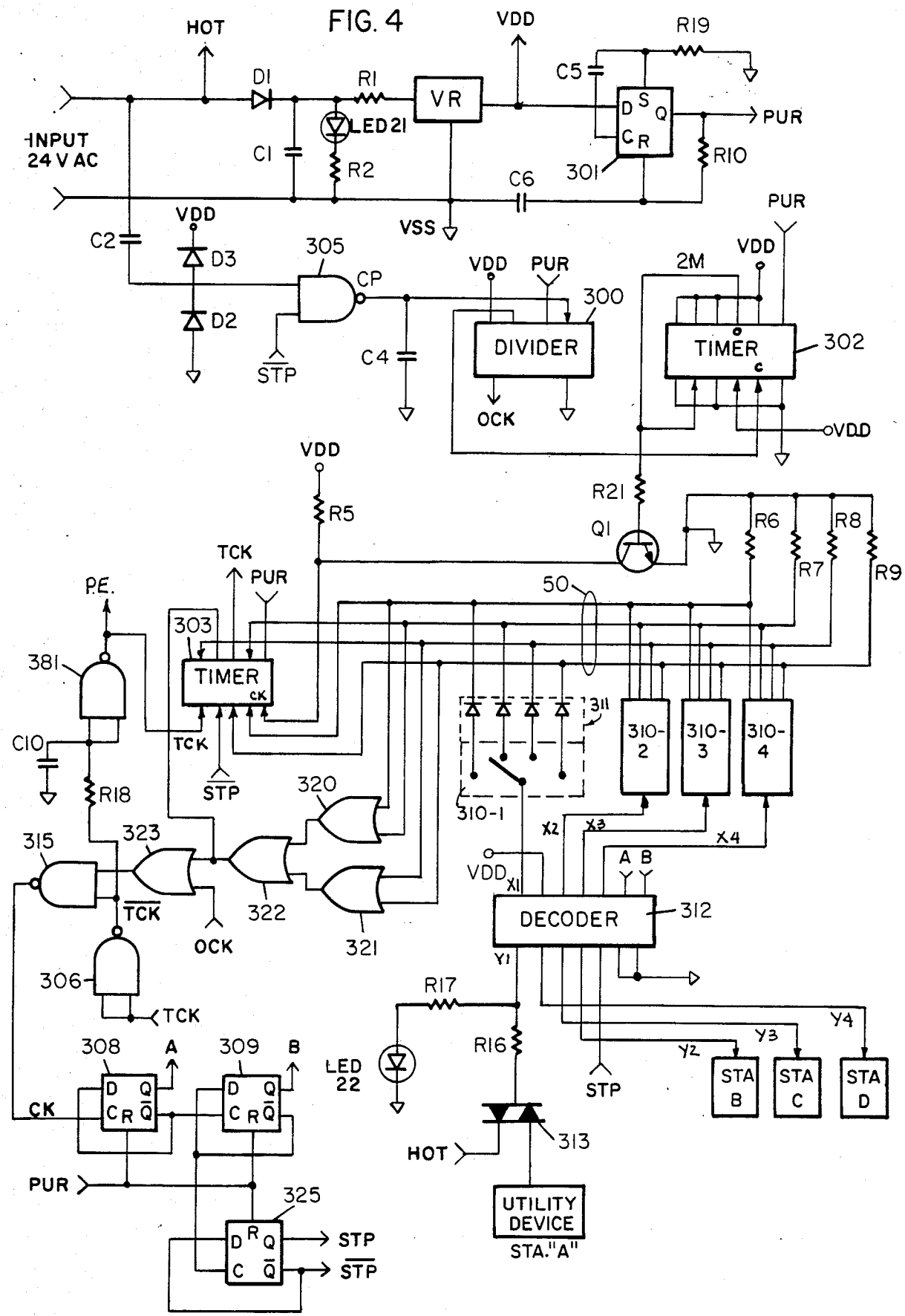

AUXILIARY SWITCHING CIRCUIT

BACKGROUND

1. Field of the Invention

This invention is directed to switch circuits, in general, and, more particularly, to a circuit device which permits a single switch circuit to be extended to a plurality of switch circuits.

2. Prior Art

There are many switching circuits known in the art. In addition, there are many programmable switching circuits and systems which are known in the art. One typical application of such circuits is in the field of irrigation control systems. These systems utilize a plurality of solenoid activated valves which are, typically, located at remote locations to control water flow at specified areas or zones. The valves are connected to electronic (or electro-mechanical) controller apparatus.

The controller, typically, includes a type of memory which can be programmed to selectively control the operation of the valves. In the primitive (or less sophisticated) systems, the programming can be controlled by various cams, gears, wheels or other mechanical or electromechanical equipment and the like. In the more sophisticated, space-age systems, the controller includes an electronic memory which can be programmed to perform very complex routines. That is, the various valves can be turned on and off for specific cycles, with selected operating durations, on a unique pattern of days, hours and so forth. Such systems are well known. One example, is U.S. Pat. No. 4,244,022 to T. L. Kendall and assigned to The Toro Company.

However, a major shortcoming of such systems is that an interruption (rupture) in the electrical interconnection wiring apparatus can render whole sections of the system inoperable. Unfortunately, a very expensive and usually disrupting repair project is required to correct the problem.

This repair may include pulling and replacing wires, as a minimum. Typically, however, the project includes digging, trenching, replacement and re-landscaping. Of course, if the digging and trenching take place through an existing parking lot, swimming pool, tennis court or similar improved area, the expense and inconvenience can be prohibitive.

Alternatively, odd ball installations with a number of independently operating sub-systems can be set up to replace the inoperative system portion. However, these unusual installations can provide an undesirably complex mosaic of a patchwork irrigation system.

Also, it is possible that battery operated controllers can be used to control the inoperative system portion. In addition to the complexity, this system is subject to battery failure, different clocking arrangements, overload of the water delivery system and the like.

SUMMARY OF THE INVENTION

This invention is directed to a switching circuit which is especially adapted to provide an "add-on" or repair device and function for irrigation systems or the like. In particular, the device of the instant invention is connected to a clocked, programmed system and its operation is controlled by the main system timer. In addition, the invention performs a clocking and programmable function which can be used to control a plurality of utilization devices, such as valve controllers. The invention can be installed along with existing equipment to provide additional control operations for the entire control system.

BRIEF DESCRIPTION OF THE DRAWINGS

FIG. 4 is a schematic diagram of the circuit of the instant invention.

DESCRIPTION OF A PREFERRED EMBODIMENT

Figure 1:
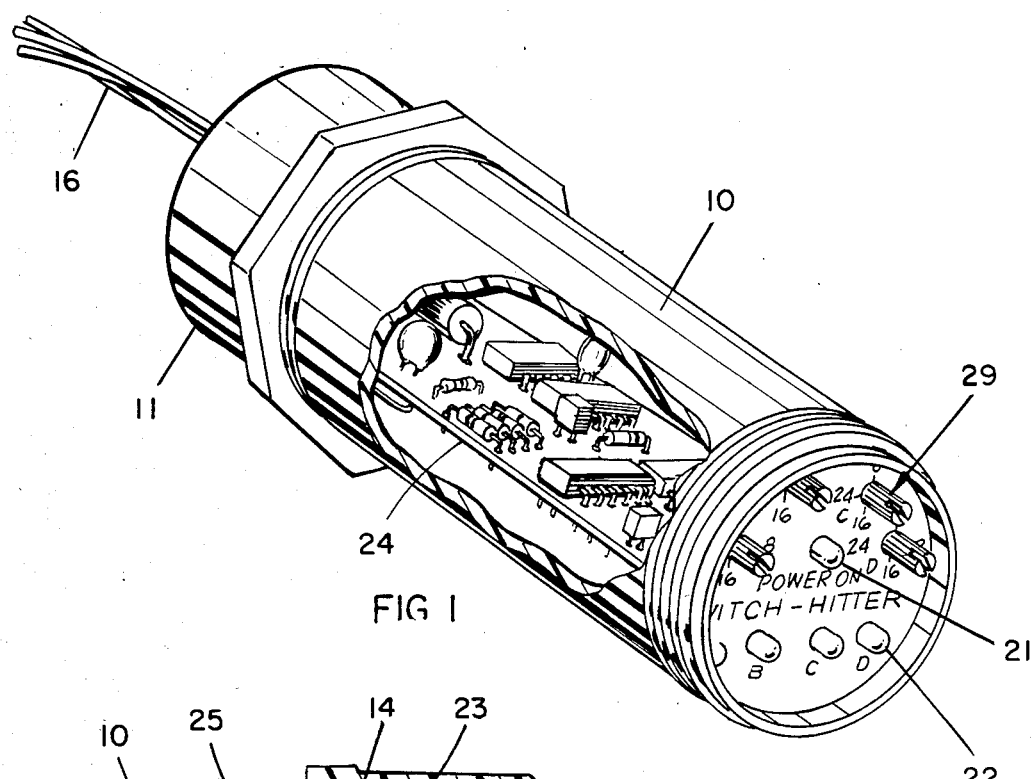
FIG. 1 is a partially broken away, perspective view of the instant invention.

Referring to FIG. 1, there is shown a partially broken-away, perspective view of the instant invention. Concurrent reference is made to FIG. 3 which shows, in cross-section, the arrangement of a significant portion of the device. The switch apparatus includes housing 10 which is of a generally hollow, cylindrical configuration. A bottom cap 11 and a top cap 12 (removed for clarity in FIG. 1) are adapted to engage the ends of housing 10. In one embodiment, the housing 10 comprises a section of PVC or ABS plastic pipe which is threaded at at least one end thereof. That is, top cap 12 (see FIG. 3) has internal threads which can engage and mate with the threaded end of housing 10. The bottom cap 11 and the other end of housing 10 can also be threaded or, alternatively, they can be arranged to make a slip (or force) fit. The threaded engagement of top cap 12 and housing 10 permits selective access to the panel 13, when cap 12 is removed. A suitable sealing gasket 14 can be included between top cap 12 and housing 10 to provide a disengagable waterproof closure mechanism. Typically, the gasket 14 is retained in a groove 14A in cap 12. The seal between bottom cap 11 and housing 10 can be the same as at the top cap, or any other suitable waterproof seal.

The circuitry is mounted on two interconnected printed circuit boards (PCB). PCB 24 is generally rectangular and is arranged to mount thereon most of the circuit components which make up the circuit of the instant invention. PCB 25 is generally circular in configuration and is used to mount the switches, light emitting devices, and related circuitry. The configurations of the PCB's is not limitative of the invention but is, at least partially, determined by the configuration of housing 10 as well as caps 11 and 12. In a typical arrangement, the internal surface of housing 10 is reamed or bored slightly to form a shoulder 30 (see FIG. 3). PCB 25 is arranged to rest on this shoulder and to support PCB 24 which depends therefrom. The connecting wires 16 extend through a suitable aperture in bottom cap 11 which aperture is then sealed with a suitable waterproof material.

In addition, appropriate insulation and mounting materials can be provided within housing 10 to support and protect the PCB's, as desired. For example, after the wires 16 have been passed through the aperture, the insulating material can be applied to the inside of cap 11 to seal the aperture therein and to the interior of housing 10 after the PCB's have been put in place. In one embodiment, the insulating material is applied in the form of a foam which can expand to fill the space and then harden in place. In addition to serving as waterproofing and insulation, the hardened material acts as a support for positioning the PCB's. Also, by closing the entire housing 10 by engaging both caps therewith during the application of the foam material, the foam material seeks to escape through any leakage point. When this occurs, the foam material hardens to seal these points of leakage. One suitable material is so-called "one-component urethane foam" of the type sold by Carlon Co. under the trademark "Great Stuff".

Figure 2:
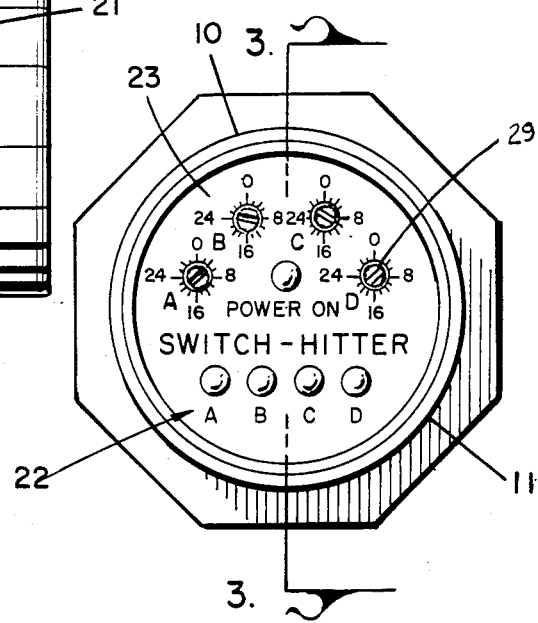
FIG. 2 is an end view of the instant invention showing the control panel thereof.

Referring now to FIG. 2, there is shown a plan view of the panel of the invention. Plate 23 can be a separate faceplate which is placed over PCB 25. Alternatively, the legends and nomenclature can be applied directly to PCB 25.

Similar components shown in FIGS. 1, 2 and 3 bear the same reference numerals and form parts of the circuit as described hereinafter. For example, the "power-on" indicator 21 is a light emitting device (LED), such as a light emitting diode. Likewise, the indicators A, B, C and D (indicated by reference numeral 22) are, typically, LED's which indicate which switch is operative. The switches 29 control the operations of the circuitry and establish the operating time for a particular valve, as discussed hereinafter.

Referring now to FIG. 4, there is shown a schematic diagram for the circuit of the instant invention.

As a general overview, the circuit described herein is an auxiliary irrigation controller that uses the power that comes from a central, main clock circuit. Typically, in the main controller there is a 24 volt, transformer coupled, A.C. power supply which runs the entire system. Typically, this source is always on. The main clock circuit counts the signals from this source to thereby keep track of the time of day, and so forth. At the appropriate times, the main clock circuit provides signals (including power) which are used to turn the valves on and off.

In a typical application, the device of this invention is tapped into the existing system at a remote location, for example, in the place of an existing, operational valve. Frequently, this arrangement is in the nature of an underground installation. In this case, the invention uses the power that comes from the main clock or controller which is intended to turn on the existing valve in the ordinary scheme established at the main controller. In the embodiment shown, that power (24, V AC) is converted to pulses CP and used to selectively turn on four separate valves. Of course, the inventive concept is not limited to four valves but can be utilized with any appropriate number.

As shown in FIG. 4, the input power for the instant circuit is provided by the main clock and is labelled 24 volts AC. This AC signal is half-wave rectified by diode D1 and filtered by capacitor C1. The signal is supplied, via current limiting resistor R1, to a 12 volt voltage regulator VR which produces a DC reference signal of 12 volts for the other side of the 24 volt AC line. The 12 volt DC signal is labelled VDD and the ground or reference side is labelled VSS.

Also, the input AC signal (designated as HOT) is passed through, inter alia, capacitor C2 to one input terminal of NAND gate 305 which selectively produces a clock pulse CP. Diodes D2 and D3 are used to clamp the swing of the 24 volt signal and to keep it from going above or below the power rails for the devices, i.e. VDD and VSS.

The light emitting diode LED 21 is a pilot light which indicates on the face plate of the device (see FIGS. 1 and 2) that the power is on. In a preferred embodiment LED 21 produces a green light but this is, in no way, limitative.

Capacitor C4 is a filter capacitor which removes any high frequency spurious pulses at the output of gate 305 and prevents divider 300 from counting that spurious signal.

In addition, when power is first applied to the circuit, the VDD signal is applied, inter alia, to the D input of D-type flip-flop 301. As a result, a short pulse is produced by flip-flop 301. This pulse is called PUR which stands for power-up reset. The PUR signal is supplied to several places in the circuit, as will be described, in order to initialize the system.

The divider 300 receives the PUR signal as an initializing input so that the divider starts at 0. The clock pulse CP from gate 305 is also supplied to divider 300 which in this embodiment is a 14 stage binary divider circuit. One output from divider 300 is labelled 0CK which stands for Zero clock. Another output from divider 300 provides the clock input C of programmable timer 302. The timer 302 operates in a typical decrementing fashion in that a binary number is inserted therein by connecting certain input terminals to VDD or VSS. In this case, the inputs are hardwired so that the circuit continuously divides by the preset number, for example the number 7 in this instance. Of course, other division factors can be utilized in other embodiments. The timer 302 begins at the preset number and counts down to 0. When the count reaches 0, the "0" output terminal goes high. In the preferred embodiment, the timer 302 produces an output signal 2M which comprises one pulse approximately every two minutes although other time sequences are possible. This signal is returned to the preset terminal of timer 302 so that the timer 302 is, selectively, preset to the value at its program terminals. In addition, the signal is supplied to transistor Q1 which inverts and buffers the signal for further operations.

In an alternative embodiment (not shown), the two minute pulse 2M may be decoded directly from the output of divider 300, rather than counting and dividing by timer 302. This decoding can be performed, for example, by a four input NAND or AND gate which will decode directly the output of divider 300 and produce a pulse at exactly two minute intervals.

Figure 3:
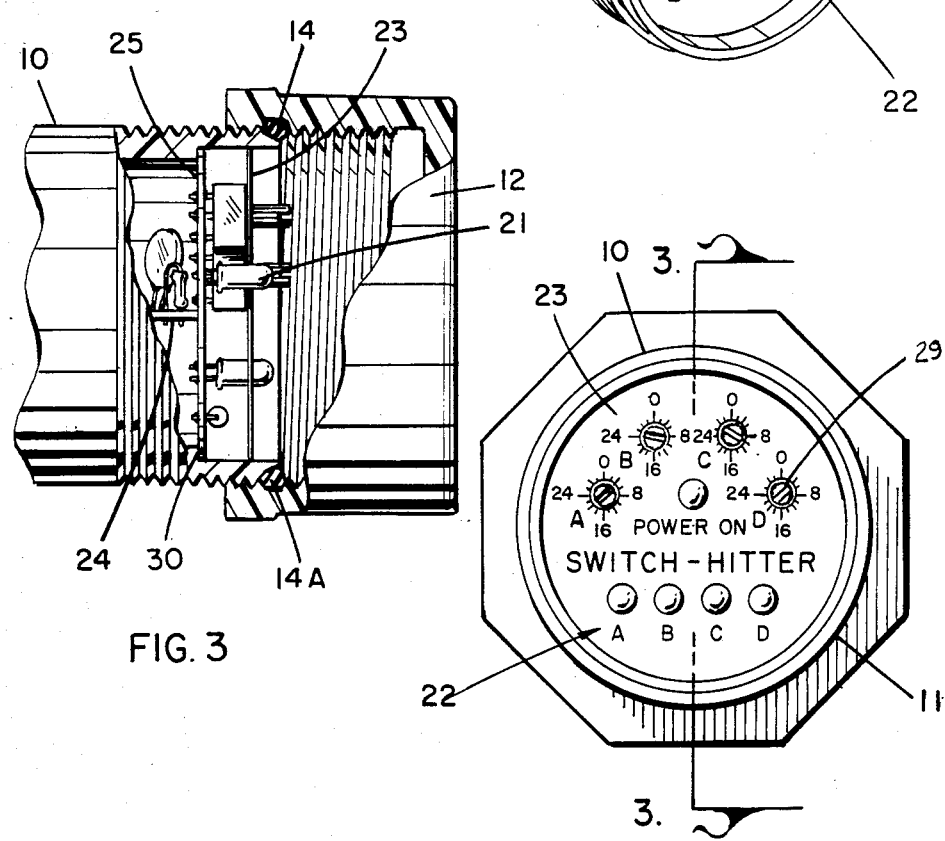
FIG. 3 is a cross-sectional view of a portion of the instant invention showing the internal arrangement thereof.

In particular, in the embodiment shown in FIG. 3, the inverted output pulse is produced every two minutes by transistor Q1 and is routed to the clock input terminal C of timer 303 via transistor Q1. The timer circuit 303 produces, inter alia, a timing signal at its "0" output terminal which is labelled TCK. The TCK signal is inverted by NAND gate 306 and is returned to timer 303 by way of NAND gate 381 as the Preset pulse $\overline{TCK}$. This preset pulse is delayed slightly by the combination of resistor R18 and capacitor C10 so the data on bus 50 can becme stable before it is applied to timer 303. The $\overline{TCK}$ signal is also supplied to NAND gate 315 where it is reinverted and becomes the counter clock signal CK and is supplied to flip-flop 308 which, together with flip-flop 309, operates as a counter circuit (sometimes) referred to as the EVENT counter).

Timer 303, is preset by the signals on bus 50 which is formed of a plurality of lines connected to the switching devices 310-1 through 310-4. The switching devices each comprise a rotary switch and a plurality of diodes 311 as shown, in detail, in switching device 310-1. The lines of bus 50 are normally pulled to ground (VSS) by resistors R6, R7, R8 and R9 unless a high level signal is supplied via a diode associated with a switch. This combination of highs and lows (1's and 0's) provides the binary coded input to the timer 303. In one embodiment, switches 310 are rotary, multi-position switches. (These switches are shown as switches 29 in FIG. 1, for example.) The diodes 311 serve the purpose of keeping the bus isolated from the switches and the switches isolated from each other. In the embodiment shown, there are four diodes for each rotary switch. Of course, other specific designs and arrangements can be used.

The signals A and B from D flip-flops 308 and 309, respectively, of the EVENT counter are routed to the dual one-of-four decoder 312. This decoder decodes the binary count from terminals A and B into one-of-four outputs (i.e. X1, X2, X3, X4 and Y1, Y2, Y3, Y4). The X outputs are routed to selectively enable the switches 310-1 through 310-4. The Y outputs are routed to respective utility devices referred to as stations A through D. For example, the Y1 output is supplied through current limiting resistors R16 and R17 to triac 313 and LED 22, respectively in Station A, which is typical in construction. When a triac is energized by the application of the appropriate Y output of decoder 312, the HOT (24 V A.C.) signal is supplied to the valve which is being controlled thereby. That is, a sprinkler valve or line is rendered operative. In this embodiment, LED 22 produces a red light to distinguish readily from the green "power-on" light of LED 21. This preference is not intended to be limitative of the invention. The decoder 312 also supplies signals to the other LEDs and triacs which are included in the circuits in the respective multiple stations B, C and D (or others). For convenience, these additional circuits are shown only in block form but are understood to be of similar circuit configuration. Thus, even though decoder 312 is a dual one-of-four decoder, both of the decoded outputs are controlled by the one set of input signals, i.e. A and B, from the EVENT counter.

Thus, the count which is currently at the EVENT counter is represented in a one-of-four situation by the outputs from decoder 312 which selectively enable switches 310-1 through 310-4. In the case of 00 count from EVENT counter (i.e. signals A and B are each 0) which represents the power-up state switch 310-1 is activated and the binary setting of switch 310-1 is established on the bus 50 which is the preset bus for timer 303. Also, the LED 22 of station A is activated to indicate that this station is operating.

When the PE (Preset Enable) signal from gate 381 is high, whatever binary signal is present on bus 50 is loaded into timer 303 to establish the value of the count down number. Once the count in the timer 303 is counted down to 0, a signal is produced which is clocked through gate 315 and advances the count on flip-flop 308.

When the EVENT counter (including flip-flop 308) advances to the next count, for example signals A and B are 01, the decoder 312 produces the next output signal which now enables switch 310-2 along with the triac and LED of station B. That is, source VDD is supplied to the respective switch and triac circuit. Once again, when the high level PE signal is applied to the preset enable input of timer 303, the signal now extant on the bus 50 because of switch 310-2 is loaded into timer 303. As noted, switch 310-2 is configured like switch 310-1. The details of the circuit are omitted for convenience and clarity in the drawings.

In the preferred embodiment, a two minute duration is the base value. Thus, when a programming switch is in the number 3 position, that represents 3×2 minutes or a 6 minute duration for that switch. It is seen that the preset bus 50 has the binary coded signal thereon which represents position 3. This count (e.g. 3) is loaded into timer 303 as the place to start counting. Timer 303 receives and counts the clock pulses from circuit 302 at the rate of one pulse every two minutes as discussed supra. When timer 303 has received three pulses it reaches 0. The EVENT counter is then updated, as described supra, which then enables the next programming switch. At that time, a high level signal is supplied to the preset enable of timer 303 and causes the signals now on the preset bus 50 to be loaded into timer 303 and the whole operation starts over again, except that the circuit is now controlled by switch 310-2. When timer 303 reaches 0, the same operation happens. That is, the EVENT counter is updated, the decoder 312 selects and turns on the triac of station C and enables switch 310-3. The information from switch 310-3 is now put on the preset bus 50 and, thence, into timer 303 which begins counting down again, and so forth.

Once the EVENT counter has timed out, i.e. has gone through four counts (in this embodiment), the STOP counter, i.e. flip-flop 325, is clocked by the $\overline{Q}$ signal from flip-flop 309, (which is the end of the chain of the EVENT counter). A stop signal, labelled STP, is produced by flip-flop 325. The stop signal is supplied to timer 303 to inhibit any further counting. The signal STP is also supplied to the decoder 312 as an inhibit signal which puts all of the outputs of decoder 312 in a "float" condition so that no further triacs or switches are enabled. Thus, the unit remains in that condition as long as power is on with no counting going on. In particular, it remains in the "idle" condition until power is removed and then resumed so that a power signal PUR is provided again to reset flip-flop 325 to the "run" condition. At this time everything else is re-initialized back to 0.

The $\overline{STP}$ signal is also supplied from flip-flop 325 to gate 305 to ensure that no counting occurs anywhere in the circuit. That is, signal $\overline{STP}$ disables NAND gate 305. Thus, even if the 60 Hz signal is still supplied to the circuit at NAND gate 305, it is not passed therethrough.

If all four programming switches 310 are set at 0, the logic circuit comprised of NOR gates 320, 321 and 322 decodes the 0 state from the bus 50 and counter 303 is inhibited by the output of gate 322. Concurrently, gate 323 is enabled so that the clock signal OCK from the timer 300 (approximately one pulse per second) produces the count signal CK from gate 315 to update the EVENT counter. Thus, the EVENT counter also advances approximately once per second, the decoder 312 decodes once per second and each triac is enabled as is the LED that is part of that circuit. This produces a "scanning" effect at the LED's which merely indicates that the circuit is cycling properly, even though no operations, per se, are being performed. This can be considered to be a "standby" mode.

Thus, there is shown and described a unique switching circuit device. This device fills a long felt need in that defective remote switch devices or circuits can be refurbished or salvaged without extensive repair problems. Also, system upgrading or add-ons can be easily accomplished by the utilization of the invention. This device has many advantages as noted above. For example, in prior art repairs, the mere inclusion of a new clock (of the electronic, solid state, or electromechanical type) does not provide the necessary system-compatible-memory.

This device is presented in a waterproof housing so that it can be placed at a remote or satellite location without concern for water damage which is very important in an irrigation system environment. The typical electromechanical clock is not accurate enough and repeatable enough to do the job within the time frame that is available. This device, in effect, provides a remote electro-mechanical memory. However, it is a binary memory so that it can readily interface with a digital circuit. Also, this circuit uses a programmable counter controlled, i.e. preset, from a bus. Moreover, this circuit controls the add-on valves or switches within the constraints and parameters established at the main controller for the valve unit which is being replaced.

While the present description is directed to a preferred embodiment, it is clear that modifications to the specific design and the individual components can be made by those skilled in the art without departing from the theme of the present invention. Any such modifications which fall within the purview of this description are intended to be included therein as well. The embodiment described herein is intended to be illustrative only and is not intended to be limitative. Rather, the scope of the invention is limited only by the claims appended hereto.

We claim:

1. A control device comprising,
   source means (305 etc.) for providing power and main clock signals,
   divider means (300) connected to said source means for dividing said main clock signals,
   first timer means (302) connected to receive signals from said divider means and providing at least one periodic timing signal (2M),
   timer setting means (50, 310),
   second timer means (303) connected to said timer setting means and to said first timer means so that the time value stored in said second timer means can be selectively changed by said timer setting means in response to said one periodic timing signal from said first timer means,
   said second timer means operative to produce different timer cycles as a function of the time value stored therein,
   bistable means (308) connected to said second timer means to count the timing cycles of said second timer means and to produce output signals representative of said count, and
   decoder means (312) connected to said bistable means for decoding the output signals produced by said bistable means and connected to said timer means to control said timer setting means as a function of said output signals produced by said bistable means.

2. The device recited in claim 1 wherein,
   said timer setting means includes bus means for supplying to said second timer means a plurality of signals which represent a time value code.

3. The device recited in claim 2 wherein,
   said timer setting means includes switch means connected between said decoder means and said bus means in order to control the signals supplied by said bus means.

4. The device recited in claim 1 wherein,
   said bistable means includes at least two flip-flops each of which produces an output signal which is supplied to said decoder means.

5. The device recited in claim 1 including,
   output means connected to said decoder means and selectively activated thereby.

6. The device recited in claim 1 including,
   stop counter means connected to said bistable means and operative to produce a stop signal which inhibits operation of said device upon receipt of a signal from said bistable means which signal is representative of a prescribed count by said bistable means.

7. The device recited in claim 1 including,
   housing means for mounting and storing the components recited in claim 1.

8. The device recited in claim 7 wherein,
   said housing includes a cylindrical tube with end caps which can be sealably engaged therewith.

9. The device recited in claim 8 wherein,
   said end caps and said housing are joined together in a watertight seal.

10. The device recited in claim 8 wherein,
    at least one of said end caps includes a gasket-like member which engages said cylindrical tube to form a secure, watertight seal.

11. The device recited in claim 5 wherein,
    said output means includes triac means for selectively activating a utilization means.

12. The device recited in claim 1 wherein,
    said source means comprises an AC power source.

13. The device recited in claim 12 including,
    power supply means for converting the signal from said AC power source to a DC signal.

14. The device recited in claim 3 including,
    isolation means connected between said switch means and said bus means to prevent interaction between said switch means.

15. The device recited in claim 14 wherein,
    said isolation means comprise rectifier diodes.

16. The device recited in claim 1 wherein,
    said source means produces main clock pulses in response to the application of power from a remote power source.

17. The device recited in claim 5 including,
    gate means connected to receive output signals from said timer setting means and to selectively supply inhibiting signals to said second timer means to inhibit the operation thereof,
    said gate means connected to receive a second timing signal from said first timer means and supply control signals representative of said second timing signal to said bistable means which control signals are supplied to said decoder means so as to scan said output means.

18. The device recited in claim 17 wherein,
    said gate means includes first gating means for detecting a prescribed signal condition at said timer setting means and producing an output signal representative of said prescribed signal condition,
    second gating means,
    said output signal from said first gating means connected to enable said second gating means and to inhibit said second timer means,
    said second gating means connected to transmit said second timing signal from said first timer means to said bistable means only when said second gating means is enabled.

19. The device recited in claim 7 including,
    a waterproof, electrically insulating potting material which is inserted into said housing to encapsulate said components.

* * * * *